United States Patent Office 2,915,530
Patented Dec. 1, 1959

2,915,530

DIACETALS

Raymond J. Kray and Frank Brown, Summit, N.J., assignors to Celanese Corporation of America, New York, N.Y., a corporation of Delaware No Drawing. Application December 2, 1955
Serial No. 550,757

11 Claims. (Cl. 260—340.7)

This invention relates to pentaerythritol diacetals and relates more particularly to the production of pentaerythritol dicetals from α,β-ethylenically unsaturated aldehydes.

It is an object of this invention to provide a new and economical process for the production of diacetals by the reaction of pentaerythritol and α,β-ethylenically unsaturated aldehydes.

Other objects of this invention will be apparent from the following detailed description and claims. In this description and claims all proportions are by weight unless otherwise indicated.

In accordance with one aspect of this invention, pentaerythritol is reacted with an α,β-ethylenically unsaturated aldehyde, such as acrolein or methacrolein or crotonaldehyde, in the presence of prosphoric acid to produce a pentacrythritol diacetal. We have found that when phosphoric acid is used as the catalyst the reaction takes place rapidly, that less side reactions occur than when other catalysts are used and that the desired crystalline diacetal is obtained directly without the necessity for the expensive purification treatments, e.g. vacuum distillation and recrystallization, which are necessary when other acid catalysts are used.

In the reaction between the pentaerythritol and the α,β-ethylenically unsaturated aldehyde the proportions of the reactants may be varied widely but best results are obtained when there is used at least a stoichiometric amount of the aldehyde, e.g. about 4 to 8 mols of aldehyde per mol of pentaerythritol. Room temperature or an elevated temperature, may be used for the reaction, it being often convenient to carry out the reaction at the reflux temperature of the reaction mixture, e.g. about 50 to 60° C., at atmospheric pressure. However, superatmospheric or subatmospheric pressures may be employed, if desired.

The concentration of phosphoric acid in the reaction mixture may be varied over a wide range. With low concentrations, e.g. 0.1% of phosphoric acid, the reaction time may be longer than desired. However, phosphoric acid has the advantage that it can be used in relatively high concentrations, e.g. about 1 to 5% or higher, to produce the desired monomeric diacetals rapidly with a minimum of side reactions.

After the reaction is completed any excess unreacted aldehyde is removed, as by distillation, and the phosphoric acid catalyst is neutralized with a suitable alkaline material, e.g. sodium hydroxide or sodium bicarbonate. The reaction mixture may then be washed with water and cooled to produce crystals of the desired diacetal.

The following examples are given to illustrate this invention further.

*Example I*

390.5 parts of acrolein, 119 parts of pentaerythritol and 5 parts of 85% phosphoric acid (containing 15% of water) are refluxed and stirred under an atmosphere of nitrogen at atmospheric pressure. During the first 2½ hours of refluxing some pentaerythritol remains undissolved. After the refluxing has continued for a total of 4½ hours, the unreacted acrolein is removed from the mixture by distillation at a subatmospheric pressure of 15 mm. of mercury absolute and at a temperature below 35° C. Thereafter 10.4 parts of sodium bicarbonate are added. The resulting neutralized mixture is washed with an equal volume of water and then cooled in an ice bath at 5° C. to yield 150.5 parts of white crystalline diallylidene pentaerythritol.

*Example II*

390.5 parts of acrolein, 119 parts of pentaerythritol and 25 parts of a composition prepared by mixing 18 parts of 85% phosphoric acid and 7 parts of phosphorus pentoxide are stirred for 2 hours at room temperature under an atmosphere of nitrogen at atmospheric pressure; during the first ½ hour all of the pentaerythritol dissolves. The unreacted acrolein is then removed from the mixture by distillation at a subatmospheric pressure of 15 mm. of mercury absolute at room temperature. Thereafter 19.7 parts of sodium hydroxide dissolved in 100 parts of water are added with cooling. The neutralized batch is then rapidly agitated with twice its volume of water and cooled to 5° C. to yield 150.5 parts of white, crystalline diallylidene pentaerythritol, melting at 42–43° C.

*Example III*

Example II is repeated using 25 parts of 100% phosphoric acid instead of the phosphoric acid composition of Example II. The results are the same as those in Example II.

*Example IV*

488 parts of methacrolein, 119 parts of pentaerythritol and 25 parts of a composition prepared by mixing 18 parts of 85% phosphoric acid and 7 parts of phosphorus pentoxide are stirred for 110 minutes at room temperature under an atmosphere of nitrogen at atmospheric pressure; during the first 20 minutes all of the pentaerythritol dissolves. The unreacted methacrolein is then removed from the mixture by distillation at a subatmospheric pressure of 15 mm. of mercury absolute at room temperature. Thereafter 19.7 parts of sodium hydroxide dissolved in 300 parts of water are added. The neutralized batch is then rapidly agitated and the dimethallylidene pentaerythritol filtered off to yield 178 parts of crystalline product, M. 115–116° C.

*Example V*

Example IV is repeated using 25 parts of 100% phosphoric acid instead of the phosphoric acid composition of Example IV. The results are the same as those in Example IV.

It is to be understood that the foregoing detailed description is merely given by way of illustration and that many variations may be made therein without departing from the spirit of our invention.

Having described our invention, what we desired to secure by Letters Patent is:

1. Process for the production of diacetals which comprises reacting pentaerythritol and an α,β-ethylenically unsaturated aldehyde of the group consisting of acrolein, methacrolein and crotonaldehyde in the presence of phosphoric acid as a catalyst to produce a pentaerythritol diacetal.

2. Process for the production of diacetals which comprises reacting acrolein and pentaerythritol in the presence of phosphoric acid as a catalyst to produce diallylidene pentaetrythritol.

3. Process as set forth in claim 1 in which the reaction is carried out at an elevated temperature and the reacted mixture is then cooled to cause the formation of crystals of said diacetal.

4. Process as set forth in claim 1 in which the concentration of phosphoric acid is at least about 1%.

5. Process as set forth in claim 2 in which the reaction is carried out with mixing in the presence of at least a stoichiometric proportion of acrolein, the proportion of phosphoric acid is about 1 to 5%, the acrolein is distilled off after the reaction and the resulting mixture is then neutralized, washed and thereafter cooled to cause the formation of crystals of diallylidene pentaerythritol.

6. Process as set forth in claim 5 and in which the reaction is carried out under an atmosphere of nitrogen.

7. Process for the production of dimethallylidene pentaerythritol which comprises reaction methacrolein and pentaerythritol in the presence of phosphoric acid as a catalyst.

8. Process as set forth in claim 7 in which the reaction is carried out in the presence of at least a stoichiometric proportion of methacrolein, the concentration of phosphoric acid is about 1 to 5%, the methacrolein is distilled off after the reaction and the resulting mixture is then neutralized, and treated to cause the formation of crystals of dimethallylidene pentaerythritol.

9. Process as set forth in claim 8 and in which the reaction is carried out under an atmosphere of nitrogen.

10. Process for the production of dicrotonylidene pentaerythritol which comprises reacting crotonaldehyde and pentaerythritol in the presence of phosphoric acid as a catalyst.

11. Process as set forth in claim 10 in which the reaction is carried out in the presence of at least a stoichiometric proportion of crotonaldehyde, the concentration of phosphoric acid is about 1 to 5%, the crotonaldehyde is distilled off after the reaction and the resulting mixture is then neutralized, and treated to cause the formation of crystals of dicrotonylidene pentaerythritol.

References Cited in the file of this patent

UNITED STATES PATENTS

| | | |
|---|---|---|
| 2,223,421 | Hubacher et al. | Dec. 3, 1940 |
| 2,535,458 | Robeson | Dec. 26, 1950 |

OTHER REFERENCES

H. Schulz and H. Wagner: Angew. Chem. vol. 62, No. 5, pp. 113–118 (1950).